Patented July 31, 1951

2,562,866

UNITED STATES PATENT OFFICE 2,562,866

MELAMINE-ALDEHYDE SEALING AGENTS AND METHOD OF MAKING THE SAME

Stewart S. Kurtz, Jr., Merion, and James S. Sweely, Swarthmore, Pa., assignors to Sun Oil Company, Philadelphia, Pa., a corporation of New Jersey No Drawing. Application October 14, 1948, Serial No. 54,586

6 Claims. (Cl. 260—29.4)

This invention relates to a sealing agent and the preparation thereof and more particularly to an improved sealing composition adapted for plugging porous subterranean formations.

The novel sealing agent of the present invention comprises an aqueous suspension of a thermosetting resin prepared by causing melamine and formalin or melamine and furfural to react to a particular stage of condensation as hereinafter fully described, and capable of further condensation to a hard infusible stage.

In the drilling of wells for oil, gas or other fluids the well bore traverses numerous formations or strata of varied porosity, such as cavernous limestone, gravel beds, oil-bearing sands, cavernous sandstones, water-bearing sands, gas-bearing sands and the like, it is frequently necessary or desirable for one reason or another to seal off certain of these formations from the borehole and many methods for effecting such sealing have been proposed. In drilling by the rotary method a drilling mud is circulated during the general drilling operation down through the drill pipe to the drill bit and thence back to the surface to overcome the formation pressure, lubricate the bit, carry cuttings to the surface and to wall off the borehole. It is not infrequent, however, that formations are encountered which are sufficiently porous that the mud fluid passes into the formation so that little or no mud returns to the surface. This condition, which is known as "lost circulation," may also be due to a breakdown of one or more of the formations traversed, caused by the high hydrostatic pressure exerted by the mud column on the formation as when the mud fluid has been heavily weighted with weighting material. In such cases steps must be taken to seal off the porous formation and prevent the loss of mud fluid. Again, it is often desirable to plug off certain strata in order to prevent or minimize ingress of undesirable fluids into the well. For instance, it may be desired to seal off water-bearing sands to increase the ratio of oil to water production.

Formerly it was general practice to accomplish such sealing operations by pumping cement grout into the well, forcing it into the porous formation, permitting it to harden in place and then drilling through the cement remaining in the borehole. Although in the case of lost circulation it has become customary more recently to add special sealing agents such as ground sugar cane stalks, mica or cellophane to the drilling fluid to improve its sealing properties, this has often proved unsuccessful, and consequently cementing operations are still used to an extent to overcome this condition. Since it is often impossible to determine the exact zone of lost circulation, a considerable amount of cement grout (sometimes five hundred feet or more) may have to be allowed to set within the borehole in order to insure sealing of the porous formation. It frequently happens that in drilling through the hardened cement the hole becomes sidetracked into the adjacent formations, thus requiring redrilling of all the hole below the point of sidetracking, perhaps including the zone of lost circulation. Similar disadvantages accompany the use of cement in sealing off water sands. A further disadvantage may arise due to the possibility that, in some cases, the cement may be forced into the oil-bearing formation to a distance sufficient to make it difficult or impossible subsequently to open the formation for production by the usual gun perforation methods.

More recently the use of resin-forming liquids capable of condensing to a solid resin under the influence of the formation temperature in place of cement has become known and has attained a limited applicability particularly in sealing water-bearing sands. While such resin-forming liquids offer certain advantages over cement, such as greater fluidity resulting in improved sealing properties and better resistance to natural brines and to acid such as used in acidizing wells, they fail to overcome the above discussed disadvantages which accompany the use of cement. Like cement, these resin-forming liquids solidify in the borehole, necessitating redrilling of that portion of the hole which thereby becomes plugged. Also, due to the greater fluidity of the resin-forming liquids as compared to cement grout, they are even more apt to penetrate an oil-bearing stratum to such extent that subsequent opening of the stratum for production becomes impossible. A further disadvantage of this type of sealing agent arises when there are substantial variations in penetrability of the earth surrounding the portion of the borehole to be sealed off, as occurs in the case of a highly porous formation adjacent to a less porous formation or as may be caused by crevices within a formation. In such cases a very large amount of the resin-forming liquid may be forced into the more penetrable portions of the surrounding earth before an effective seal of the less penetrable portions is obtained, with the result that the expense involved in carrying out the sealing operation becomes excessive.

The present invention is directed to and provides an improved sealing agent which overcomes the above-discussed disadvantages of sealing agents heretofore employed. The novel sealing composition according to this invention comprises a suspension in water of a thermosetting resin prepared by reacting melamine and formalin or melamine and furfural under condensation conditions, the resin being partially condensed to a particular intermediate stage requisite to impart to the suspension the desired sealing characteristics. This particular stage of condensation may be described as an intermediate plastic solid stage. The partially condensed resin corresponding thereto is dispersible in water, by conventional mechanical means such as by stirring and without the aid of an emulsifying agent, to a state which is substantially non-coalescing for at least five hours, i. e. the dispersed resin particles do not coalesce substantially when the suspension is permitted to stand for this period of time. The suspension obtained by dispersing in water the resin corresponding to the aforesaid particular intermediate plastic solid stage, which suspension constitutes the sealing agent of the present invention, is characterized by its ability, when forced into a bed of granular material such as sand or gravel having void spaces substantially larger than the size of the dispersed resin particles, to form a resin plug at the face of the bed, which, upon application of heat, will condense to a hard layer substantially impervious to drilling fluids. In other words, the suspension is capable of forming a resin plug or sheath at the face of a porous body without any considerable penetration of the resin into the body even though the latter has pores or voids which are substantially larger than the dispersed resin particles. Further, this resin plug under the influence of heat will condense to a hard sheath impervious to drilling fluids and having considerable mechanical strength as distinguished from a crumbly or powdery resin layer.

The aqueous suspensions of the present invention have the great advantage over previously known sealing agents of not forming a difficultly drillable solid mass within the well bore. While the resin particles of the suspension which remains in the borehole may coalesce to an extent with time, the coalesced resin upon curing under borehole conditions does not become the hard solid mass that is obtained when a resin-forming liquid or cement grout is used as the sealing agent. Furthermore, after the resin layer has been plastered out on the borehole wall, setting of unplastered resin to a solid mass within the borehole may be minimized or prevented by flushing out the suspension before the resin has had time to cure. This may be accomplished by circulating a stream of water into and out of the borehole, preferably slowly to insure against the possibility of flushing out part of the plastered resin layer. The resin layer remaining on the borehole wall and slightly penetrating the adjacent formation cures under the formation temperature to a hard sheath which generally may be of the order of one-quarter to one inch thickness. Thus, any oil-bearing stratum which has been sealed off may readily be opened up for production by the usual gun perforation method. A further advantage results from the ability of the suspension to plaster out at the face of even a very porous formation, such as one-quarter inch gravel, since this characteristic prevents deep penetration of the resin into the formation and thus reduces to a minimum the amount of resin required to obtain an effective seal. Also the fact that the sealing agent which remains in the borehole is composed partly of water instead of entirely of resin further reduces the amount of resin required for carrying out the operation.

The first step in the procedure of preparing the sealing agent of this invention comprises reacting melamine and formalin (which consists of about 40% formaldehyde in aqueous solution) or melamine and furfural under condensation conditions to the desired stage. An acid or alkaline catalyst may be used to change the speed of the reaction, but the effect of any one catalyst may vary according to the proportions of reactants in the reaction mixture. At high weight ratios of melamine to formalin, for instance, sodium hydroxide increases the speed of reaction; and at low ratios, decreases it. Since, at melamine to formalin ratios of about 1/4, the reaction time without catalyst is quite short, the use of sodium hydroxide to decrease the reaction rate at such a ratio may be advantageous in that it will facilitate the stopping of the condensation at the desired stage.

In the case of the melamine-formaldehyde type resin, the behavior of the reaction mixture during the course of the condensation also varies according to the reactant proportions. Satisfactory sealing agents can be prepared with less than 10 hours reaction time when from one-sixth to twenty parts of formalin per part of melamine by weight are used. When the weight ratio is between one-sixth and approximately three parts of formalin per part of melamine by weight, there are at least two phases present in the reaction mixture at all times. When the weight ratio is between approximately three and twenty parts of formalin per part of melamine by weight, the mixture is, during part of the reaction, single phase.

In the latter case, when the reactants are initially mixed, they form a chalky white slurry. Two phases are present, solid melamine and aqueous formaldehyde. The mixture is then brought to the reaction temperature, which is preferably between 90° C. and 100° C. During this increase in temperature or shortly thereafter, the mixture clears, becoming a single phase solution having the appearance of water. Upon further reaction, the liquid becomes more viscous until a point is reached at which a second phase precipitates from the reaction mixture. This phase is the partially condensed melamine-formaldehyde resin. The reaction mixture assumes a milky appearance, becoming denser and more opaque as the precipitated resin increases in quantity until a point is reached at which the stirring is no longer capable of keeping the reaction mixture relatively homogeneous and the resin phase becomes a distinguishable white mass, a soft, sticky, semi-liquid material.

As the reaction proceeds still further, the resin mass gradually changes in appearance and properties, passing through a stage at which it is gummy and resembles a solid more than a liquid. Finally, the resin phase enters the stage wherein it is a plastic material, of properties that will be different according to the original reactant proportions and to the catalysis conditions prevailing in the reaction. It may be either a white, plastic solid or a white mass with the appearance and consistency of set gelatin, but in either case, in this stage, it is recognizably different from the resin phases of the earlier stages.

The above description of the behavior of the reaction mixture refers to the conditions prevailing at the reaction temperature, which is preferably an elevated temperature of about 90° C.–100° C. The conditions, however, at which the suitability of the resin product for use in the present invention are determined are those prevailing at ordinary temperatures of about 20° C.–30° C. In order to determine the room temperature properties of a resin phase produced after a given period of reaction time has elapsed, the resin phase may be separated from the rest of the reaction mixture and mixed with cold water to reduce its temperature quickly and to prevent any further reaction beyond the time at which it is desired to know the room temperature properties of the resin product.

When the above procedure is carried out, it is discovered that the resin phase at room temperature may have a different appearance than at the reaction temperature. For example, a reaction mixture that is still a water-white or a milky liquid at the reaction temperature may, at certain reactant ratios and under certain catalysis conditions, become a heterogeneous system upon cooling with water, in which system the resin phase is a soft, sticky, semi-liquid mass, a gummy semi-solid mass, or even a plastic solid or gelatinous material.

Regardless of what change in appearance may occur upon cooling, the stage in which the cooled resin product is a white plastic solid or gel is the desired intermediate plastic solid stage at which the resin product is dispersible in water to form a suspension which is substantially stable for a reasonable time, such as at least five hours.

When no catalyst is used, there is relatively little difference during the intermediate plastic solid stage between the nature of the resin product when at reaction temperature and when at room temperature. The resin is at both temperatures either a white gelatinous material or a white plastic solid depending on the reactant proportions. The effect of cooling is merely to cause the resin phase to become somewhat tougher. Previous to the intermediate plastic solid stage, the reaction mixture may be a water-white or milky, viscous liquid when hot and a sticky or gummy semi-liquid or semi-solid material when cooled by mixing with water.

When sodium hydroxide is used to change the speed of the reaction, the intermediate plastic solid stage during which the cooled product is a plastic solid or gel includes reaction times at which the reaction mixture is a viscous liquid when hot, forming the solid or gel only after cooling by mixing with water. It also includes longer reaction times at which the hot reaction mixture contains a separated soft, gelatinous resin which becomes tougher upon cooling. Previous to the intermediate plastic solid stage, the reaction mixture may be a viscous liquid when hot and a sticky or gummy semi-liquid or semi-solid material when cooled by mixing with water.

If, with catalysis or without, the reaction is stopped before the intermediate plastic solid stage is reached, the result will be a product which will be unsatisfactory for use in the present invention. Such products include products which are, when cool, liquids or sticky semi-liquids or gummy semi-solids. A product which is liquid when cool may be suspendible in water with the aid of an emulsifying agent, but the suspension will not plaster on coarse sand, but instead penetrate deeply into formations of any substantial porosity. A product of the sticky, semi-liquid type when cool cannot be suspended at all. A product of the gummy, semi-solid type may be difficultly suspendible, but the suspension will tend to coalesce within a short time, that is within five hours.

In the case where two phases are present throughout the reaction, that is, at formalin to melamine ratios between one-sixth and approximately three, the reactants when initially mixed, form a chalky white slurry, as in the case first described. The mixture is brought to reaction temperature, and as the reaction proceeds, the slurry becomes more viscous. It is impossible to tell whether upon formation the resin precipitates from the reaction mixture, since the latter is multiphase throughout.

As the reaction proceeds still further, the mixture assumes the appearance of a semi-solid material, somewhat resembling milk of magnesia, though the solid constituents are more discrete. Upon still further reaction, a stage is reached at which the product is a white, plastic solid which is dispersible in water to form a suspension which is substantially stable for at least five hours. This is the desired intermediate plastic solid stage at which the reaction should be stopped. If the reaction were to be stopped before this stage, and an attempt made to suspend the product without the aid of an emulsifying agent, either the product would not suspend or it would form a suspension incapable of persisting for five hours.

In the case of the melamine-furfural type resin, satisfactory sealing agents can be prepared within reasonable reaction times when from one to eight parts of furfural per part of melamine by weight are used.

When the reactants are initially mixed, they form a black mixture in which two phases are present, solid melamine and liquid furfural. The initial appearance of this mixture, when agitated, differs according to the relative proportions of reactants used. When melamine predominates, the mixture has the appearance of a black slurry. Mixtures with increasing proportions of furfural tend more to the appearance of a liquid than a slurry. At high ratios of furfural to melamine, the initial mixture appears under agitation to be a viscous liquid; solid constituents are not readily discernible.

After the reactants are mixed, they are brought to the reaction temperature, which is preferably between 90° C. and 100° C. During this heating, the agitated mixture, at high ratios of melamine to furfural, becomes more homogeneous in appearance, tending more toward liquid, rather than slurry, nature. As the reaction proceeds, however, partially condensed resin begins to form, whereupon the mixture will begin to become more viscous again, and the solid constituents will become more readily distinguishable, so that the mixture itself begins to behave less like a liquid and more like a solid under the agitation. The partially condensed resin which is formed remains during the entire reaction well distributed throughout the reaction mixture; that is, there is no formation of a readily separable or distinguishable resin phase.

Upon still further reaction, a stage is reached wherein the partially condensed resin predominates to such an extent and is itself of a sufficiently advanced degree of condensation that the reaction mixture is composed of a black plastic solid admixed with just enough liquid to render it capable of being stirred.

The stage just described is the desired intermediate plastic solid stage at which the resin is suspendible in water by stirring and the suspension is capable of persisting for a substantial period of time, such as at least five hours. The reaction should be stopped during this stage. If it were stopped earlier and an attempt made to suspend the product without the aid of an emulsifying agent, either the product would not suspend or it would form a suspension incapable of persisting for five hours.

It is to be noted that the above described behavior of the reaction mixture will vary somewhat according to the initial reactant proportions, but in any case, the desired product is that obtained within the intermediate plastic solid range, and a few trial runs will enable a skilled operator to recognize from the appearance of the reaction mixture the proper stopping point for any given ratio within the operable range.

While reaction temperatures of 90° C.–100° C. have been described as optimum, higher and lower temperatures may be used with satisfactory results in both the formalin and furfural reactions.

If, with either type of resin, the reaction is allowed to proceed beyond the desired intermediate stage, the resin will become too tough or hard for the suspended particles, upon plastering and curing on sand or gravel, to fuse together properly and thereby produce a resin layer having good mechanical strength. More or less concurrently although not exactly so, the resin will tend to lose its ability to be dispersed by stirring or at least will be dispersible only with great difficulty. The first indication, however, that the reaction is being carried past the desired stage is shown by the nature of the resin layer obtained on forcing an aqueous suspension of the resin product into a body of sand or gravel. Although the resin may still be suspendible and may plaster out from the suspension at the face of the porous material, the resulting resin layer after curing under the influence of heat will tend to have poorer mechanical strength, being hard but brittle if the reaction has proceeded somewhat further than is desirable and then becoming crumbly or powdery if the reaction has proceeded substantially past the desired stage.

The range in degree of condensation between a product which is too soft and one which is too hard to produce a suitable sealing agent is rather limited. It is important that the reaction be stopped within this range and preferably well within the range for this gives a product which is readily dispersible to a non-coalescing state, which will plaster out of the suspension properly yielding a resin layer which on curing becomes a strong sheath impervious to drilling fluids, and which, in addition, can withstand a reasonable amount of preheating of the suspension without substantial loss of plastering and curing qualities. This last-named property of retaining the desired sealing characteristics even after the suspension has been heated for a reasonable time (e. g., one hour at 150° F. or one-half hour at 200° F.) serves in practice to insure effective sealing of the formation even when there is a substantial interval between the time of introducing the suspension into the borehole and the time it reaches, and the resin plasters out on, the formation.

The final step in the preparation of the sealing agent comprises forming the resin-in-water suspension. This may be carried out simply by vigorously mixing together the resin and water as by means of a motor-driven stirrer. In cases where a catalyst has been used to change the speed of the condensation reaction, the catalyst may at this point be washed out of the partially condensed resin by first agitating the partially condensed resin with several volumes of water until it is well dispersed, allowing the mixture to stand for a short time sufficient to permit dispersed particles to settle and form a concentrated suspension as the lower layer, decanting the excess water, then mixing the concentrated suspension with additional quantities of water and repeating the procedure until substantially all of the catalyst has been removed.

Even if a catalyst has not been used, it is desirable, though not strictly necessary, to wash the resin with water several times after decanting the liquid reaction products.

The following examples, in which parts are by weight, serve to illustrate the invention more specifically:

*Example I*

A series of runs was made in which melamine-formaldehyde resins were prepared, with reaction times varying with each run. In each run, 100 parts of melamine and 400 parts of formalin were mixed, and the mixture was heated to a temperature of 94° C.–95° C., and reacted without catalysis at this temperature. The time of reaction was measured from first contact of the reactants with each other. During the reaction the mixture was constantly stirred by means of a motor-driven stirrer and the temperature was maintained at 94° C.–95° C. by means of a constant temperature bath surrounding the reaction vessel. After the reaction had been stopped, the resin was separated from the rest of the reaction mixture and the separated resin was tested for dispersibility and sealing qualities. The ability to form a non-coalescing suspension was determined by mixing with water in the manner described hereinbefore. The sealing qualities were determined by forcing the resulting suspension into a bed of 10 mesh sand, then curing the resin filter cake at a temperature of 200° F. and observing the character of the cured cake. The following results were obtained:

Reaction time=5 minutes: The resin was a viscous liquid when hot and a white, gummy semi-solid when cooled by contact with water. This product could not be suspended by stirring.

Reaction time=10 minutes: The same sort of resin was obtained as with a 5 minute reaction time.

Reaction time=15 minutes: The resin was a soft gelatinous material at the reaction temperature. On cooling, it became tougher and could be suspended in water. The suspension plastered on 10 mesh sand, and cured in 4¼ hours to form a hard layer of satisfactory properties.

Reaction time=18 minutes: A resin was obtained of properties similar to those of the resin obtained with a 15 minute reaction time. The suspension cured in 2 hours to form a satisfactory filter cake.

Reaction time=22 minutes: The resin obtained was similar in appearance to the resins produced with 15 and 18 minute reaction times. The suspension cured in 3 hours to a satisfactory filter cake.

Reaction time=25 minutes: The resin when cooled was quite tough and produced a coarse suspension in water. A brittle filter cake was formed in 3 hours.

Reaction time=36 minutes: The same sort of resin was obtained as with a 25 minute reaction time. A crumbly filter cake was formed in 3 hours.

Reaction time=50 minutes: The resin formed was a very tough, hard, white solid and the reaction mixture was very nearly impossible to stir. The resin produced a coarse suspension in water, which gave an unsatisfactory filter cake.

*Example II*

Another series of runs was carried out under conditions as described in Example I except that 0.25 per cent of a 10 per cent aqueous solution of sodium hydroxide was used to change the rate of the condensation reaction. The sodium hydroxide was added to the formalin, and the time of reaction was measured from first contact of melamine with the sodium hydroxide-containing formalin. The results were as follows:

Reaction time=135 minutes: The resin was a viscous liquid when hot and a white, sticky semi-liquid when cooled by contact with water. This product could not be suspended by stirring.

Reaction time=145 minutes: The resin was a viscous liquid when hot and a white, gummy semi-solid after cooling. This product could be suspended only with great difficulty. The suspension plastered on 10 mesh sand, but on application of heat, it flowed into the sand bed and, hardening in three hours, consolidated the bed instead of plugging its surface.

Reaction time=154 minutes: The resin was a viscous liquid when hot and a plastic white solid after cooling. The product could be suspended, but with some difficulty. A satisfactory filter cake was formed in 5 hours.

Reaction time=160 minutes: The resin was a viscous liquid when hot and, after cooling, a plastic white solid which could be satisfactorily suspended. A satisfactory filter cake was obtained in 3½ hours.

Reaction time=180 minutes: The resin was a viscous liquid when hot and, after cooling, a plastic white solid which could be suspended and gave a satisfactory filter cake in 11 hours.

Reaction time=201 minutes: The resin was a soft gelatinous material at the reaction temperature. On cooling, it became tough and gave a coarse suspension in water. A satisfactory filter cake was formed in 4 hours.

Reaction time=250 minutes: The same sort of resin was formed as with a 201 minute reaction time. A satisfactory filter cake was formed in 4½ hours.

Reaction time=275 minutes: The resin was a soft gelatinous material when hot. On cooling, it became very tough and gave a coarse suspension. The filter cake formed after curing for 3 hours was very brittle, and its low quality indicated that a longer reaction time would not produce a satisfactory product.

A comparison of these results with those of the preceding example shows that the addition of caustic soda has a substantial effect in decreasing the rate of reaction at this reactant ratio.

*Example III*

A series of runs was made in which for each of a number of varying reactant ratios, the time required to form a product satisfactory for forming the sealing agent was determined. No catalyst was used, and the temperature was maintained between 90° C.–100° C. With melamine-formalin ratios between 6 to 1 and 1 to 20, products corresponding to the desired stage of condensation were obtained. At ratios beyond these limits, such products could not be obtained. At ratios within the limits, products satisfactory for forming the sealing agent were obtained at the following reaction times:

| Melamine-formalin ratio | Reaction time, minutes |
|---|---|
| 6/1 | 264 |
| 4/1 | 186 |
| 2/1 | 575 |
| 1/1 | 185 |
| 1/3 | 52 |
| 1/4 | 15 |
| 1/5 | 28 |
| 1/8 | 65 |
| 1/10 | 179 |
| 1/12 | 155 |
| 1/20 | 460 |

*Example IV*

A run was carried out at conditions as described in Example III except that 0.5 per cent of a 10 per cent aqueous solution of sodium hydroxide was used to change the speed of the reaction.

At a melamine to formalin ratio of 2/1, a satisfactory product was obtained in 112 minutes. From this result, it is apparent that at a 2/1 ratio 0.5 per cent sodium hydroxide increases the speed of the reaction.

*Example V*

A run was carried out at 90° C.–100° C. using .05 per cent of a 5 per cent aqueous solution of sulfuric acid to change the speed of the reaction. The melamine to formalin ratio was 1/4. A satisfactory product was obtained in 9 minutes, indicating that at this ratio the acid catalyst slightly increases the speed of the reaction.

*Example VI*

A series of runs was made in which for each of a number of varying ratios of melamine to furfural the time required to form a product satisfactory for making the sealing agent was determined. No catalyst was used, and the temperature was maintained between 90° C.–100° C. With melamine-furfural ratios between 1 to 1 and 1 to 8, products corresponding to the desired stage of condensation were obtained. At higher ratios, the relative amount of solid in the reaction mixture was so great that the latter could not be stirred and conducting the reaction under such conditions was impracticable. At lower ratios, the products obtained after as much as 4½ hours reaction time gave suspensions that would plaster on 20–30 mesh, but not on coarser sand. At ratios within the limits, products satisfactory for forming the sealing agent were obtained at the following reaction times:

| Melamine-furfural ratio | Reaction time, minutes |
|---|---|
| 1/1 | 523 |
| 1/4 | 285 |
| 1/8 | 318 |

In sealing a formation by introducing the sealing agent into the borehole and forcing it into the formation, either the concentrated suspension or a dilute suspension of the resin may be used. It has been found that contamination of the sealing agent by minor amounts of drilling mud, such as may happen during actual use of the sealing agent in a well bore, does not cause any decrease in the plastering ability of the suspension nor does it cause any substantial loss in mechanical strength of the cured resin layer. However, drilling mud in amount over 50 per cent in the suspension results in a resin layer having poorer mechanical strength and generally unsatisfactory for effecting a good seal.

We are aware that it has been proposed heretofore to incorporate a thermosetting resin or reactants capable of forming such resin in the drilling fluid circulated during the general drilling operation. The sealing agent herein described, however, is not a drilling fluid and is not suitable for use during the general drilling operation.

This application is a continuation-in-part of an application filed August 9, 1945, Serial No. 609,927, now U. S. Patent No. 2,457,160 issued December 28, 1948.

In our copending applications Serial Nos. 54,587 and 54,588 both filed October 14, 1948, of which 54,588 has matured into Patent No. 2,559,162, issued July 3, 1951, there are disclosed and claimed the methods of preparing sealing agents by condensing urea or thiourea in certain proportions with formalin or furfural to an intermediate plastic solid stage at which the resin formed exhibits certain properties, stopping the reaction at that stage, and dispersing the resin in water to form a non-colloidal aqueous suspension. The method of sealing a porous formation traversed by a borehole by means of the sealing agent of the present invention is not herein claimed as that forms the subject matter of our copending application, Serial No. 609,928 filed August 9, 1945.

We claim:

1. Method of preparing a sealing agent for sealing porous formations which comprises reacting melamine with a reactant selected from the group consisting of formalin and furfural under condensation conditions to form a thermosetting resin, the weight proportion of melamine to the second-named reactant being within the range of one to ⅙–20 when said second-named reactant is formalin and one to 1–8 when said second-named reactant is furfural; continuing the reaction until the resin has reached an intermediate plastic solid stage at which it is dispersible by stirring in water without the aid of an emulsifying agent to form a non-colloidal suspension stable for at least five hours; stopping the reaction when said intermediate plastic solid stage is reached whereby to obtain a partially condensed resin capable of further condensation to a hard infusible stage upon application of heat, said partially condensed resin comprising, when said second-named reactant is formalin, a distinguishable agglomerated resin mass; disintegrating, when said second-named reactant is formalin, said resin mass; and dispersing the resin while still soft solely by stirring in water thereby forming, as the desired product, a non-colloidal aqueous suspension which, when forced into a bed of 10 mesh sand, will form a resin sheath at the face of the bed capable of thermosetting to a hard layer substantially impervious to drilling fluid.

2. A sealing agent prepared in accordance with the method defined in claim 1.

3. Method of preparing a sealing agent for sealing porous formations which comprises reacting melamine with formalin in the weight proportion of one part of melamine to ⅙–20 parts of formalin under condensation conditions to form a thermosetting resin; continuing the reaction until the resin has reached an intermediate plastic solid stage at which it is dispersible by stirring in water without the aid of an emulsifying agent to form a non-colloidal suspension stable for at least five hours; stopping the reaction when said intermediate plastic solid stage is reached whereby to obtain a partially condensed resin comprising a distinguishable agglomerated resin mass, said partially condensed resin being capable of further condensation to a hard infusible stage upon application of heat disintegrating said resin mass; and dispersing the disintegrated resin mass while still soft solely by stirring in water thereby forming, as the desired product, a non-colloidal aqueous suspension which, when forced into a bed of 10 mesh sand, will form a resin sheath at the face of the bed capable of thermosetting to a hard layer substantially impervious to drilling fluid.

4. A sealing agent prepared in accordance with the method defined in claim 3.

5. Method of preparing a sealing agent for sealing porous formations which comprises reacting melamine with furfural in the weight proportion of one part of melamine to 1–8 parts of furfural under condensation conditions to form a thermosetting resin; continuing the reaction until the resin has reached an intermediate plastic solid stage at which it is dispersible by stirring in water without the aid of an emulsifying agent to form a non-colloidal suspension stable for at least five hours; stopping the reaction when said intermediate plastic solid stage is reached whereby to obtain a partially condensed resin capable of further condensation to a hard infusible stage upon application of heat; and dispersing the resin solely by stirring in water thereby forming, as the desired product, a non-colloidal aqueous suspension which, when forced into a bed of 10 mesh sand, will form a resin sheath at the face of the bed capable of thermosetting to a hard layer substantially impervious to drilling fluid.

6. A sealing agent prepared in accordance with the method defined in claim 5.

STEWART S. KURTZ, JR.
JAMES S. SWEELY.

REFERENCES CITED

The following references are of record in the file of this patent:

UNITED STATES PATENTS

| Number | Name | Date |
|---|---|---|
| 1,899,109 | Ripper | Feb. 28, 1933 |
| 2,310,004 | Widmer et al. | Feb. 2, 1943 |
| 2,345,543 | Wohnsiedler et al. | Mar. 28, 1944 |

FOREIGN PATENTS

| Number | Country | Date |
|---|---|---|
| 480,316 | Great Britain | Feb. 17, 1938 |